United States Patent
Tel

(10) Patent No.: US 6,565,002 B1
(45) Date of Patent: May 20, 2003

(54) METHOD AND SYSTEM FOR IDENTIFYING ONE OR MORE OBJECTS

(75) Inventor: Teunis Tel, Groningen (NL)

(73) Assignee: Unicate B.V., Naarden (NL)

( * ) Notice: Subject to any disclaimer, the term of this patent is extended or adjusted under 35 U.S.C. 154(b) by 0 days.

(21) Appl. No.: 09/621,171

(22) Filed: Jul. 21, 2000

Related U.S. Application Data

(63) Continuation of application No. PCT/NL99/00036, filed on Jan. 20, 1999.

(30) Foreign Application Priority Data

Jan. 22, 1998 (NL) .............................................. 1008097

(51) Int. Cl.⁷ .................................................. G06K 7/10
(52) U.S. Cl. ........................................ 235/454; 283/73
(58) Field of Search ................................ 235/454, 382, 235/487; 380/51; 705/62; 713/179; 283/72, 73, 83

(56) References Cited

U.S. PATENT DOCUMENTS

| | | | |
|---|---|---|---|
| 3,313,941 A | * 4/1967 | Marks | 250/219 |
| 3,636,318 A | * 1/1972 | Lindstrom et al. | 235/488 |
| 4,138,057 A | * 2/1979 | Atalla | 235/380 |
| 4,218,674 A | * 8/1980 | Brosow et al. | 340/149 |
| 4,395,628 A | 7/1983 | Silverman et al. | |
| 4,423,415 A | * 12/1983 | Goldman | 340/825.34 |
| 4,682,794 A | * 7/1987 | Margolin | 283/82 |
| 5,354,097 A | * 10/1994 | Tel | 283/72 |
| 5,621,219 A | * 4/1997 | Van Renesse et al. | 250/559.44 |
| 5,654,751 A | * 8/1997 | Richard, III | 348/192 |
| 5,719,939 A | * 2/1998 | Tel | 380/23 |
| 6,135,355 A | * 10/2000 | Han et al. | 235/493 |

FOREIGN PATENT DOCUMENTS

| | | | |
|---|---|---|---|
| DE | 1 931 536 | * | 5/1974 |
| EP | 0 384 274 A3 | * | 8/1990 |
| FR | 2 576 696 A | | 8/1986 |
| GB | 2 221 870 A | | 2/1990 |
| WO | WO 91 19614 A | | 12/1991 |
| WO | 99/17486 | * | 4/1999 |

* cited by examiner

*Primary Examiner*—Diane I. Lee
(74) *Attorney, Agent, or Firm*—Davis Wright Tremaine, LLP

(57) ABSTRACT

In a method and system for identifying one or more objects, a two-dimensional, optically readable pattern and an identification code are generated. The pattern and the identification code are paired in one-to-one correspondence by means of a predetermined algorithm and are arbitrary. A two-dimensional representation of the pattern is provided on the object or on a pattern support connected thereto. The identification code is stored together with associated identification information. In order to identify the object, the representation of the pattern thereof is optically scanned and the associated identification code determined, by means of which the identification information can be determined.

10 Claims, 2 Drawing Sheets

METHOD AND SYSTEM FOR IDENTIFYING ONE OR MORE OBJECTS

This is a continuation of application Ser. No. PCT/NL99/00036, filed Jan. 20, 1999.

The present invention relates to a method for identifying one or more objects, comprising the following steps: generating a two-dimensional, optically readable pattern and an identification code, the pattern and the identification code being paired in one-to-one correspondence by means of a predetermined algorithm; providing a two-dimensional representation of the pattern on the or each object, or on a pattern support to be connected to the or each object, such as a label, sticker or the like; storing the identification code and associated identification information; optical scanning of the representation of the pattern of the or each object; determining the associated identification code; and identifying the or each object on the basis of the identification information associated with the identification code.

The invention also relates to a system for implementing the method.

BACKGROUND OF THE INVENTION

In the prior art, such a method is known for identifying an object by means of a barcode or a dotcode, in which the code in the form of regular, machine-readable pattern of bars or dots, respectively, can have been provided directly on a surface of the object or can also have been provided on a support affixed to the object. The barcode and the dotcode are structured for many applications according to internationally accepted standards, each represent an alphanumeric identification code and are often issued centrally to prevent one and the same code being used for the identification of different objects.

The barcode is a one-dimensional code which has a limited length and hence offers a limited number of mutually different identification codes. The dotcode is a two-dimensional code which, per unit of surface, offers a greater, but still essentially limited number of mutually different identification codes. A drawback with using a barcode and a dotcode is consequently that, because of the quantity of identification codes thereby to be formed, which quantity is limited within reasonable dimensions, they are unsuitable for mutually differently characterizing large quantities of objects on which the surface for the application of the barcode or dotcode is relatively small.

Another drawback is that one is generally dependent upon an external body for the issuing of a new barcode or dotcode, in which case there will be a considerable, in many cases unacceptable time delay and some desired codes may turn out to be unavailable.

From document U.S. Pat. No. 5,354,097, it is known per se to use a unique pattern of overlying individual fibres embedded in a transparent material, for demonstrating the authenticity of an object by making use of the unique three-dimensional characteristics of a fibre pattern of this kind through optical scanning from one or more different directions. From the aforementioned document it is not known to use the fibre pattern embedded in a transparent material as a means for identifying objects.

Moreover, the stiffness needed for the required dimensional stability would render the fibre pattern embedded in a transparent material unusable for many applications, for example the identification of flexible objects such as textiles. In addition, an optical scanning of the fibre pattern, especially in the case of flexible objects, is particularly awkward to conduct, since under these circumstances the fibre pattern could only be reliably positioned relative to an optical scanning device with great difficulty. Owing to the required depth of field, furthermore, the fibre pattern can only be scanned at a relatively short distance.

SUMMARY OF THE INVENTION

The invention aims to overcome the aforementioned drawbacks, or at least largely eliminate them, and to this end firstly provides a method of the kind stated in the preamble, which is characterized in that the pattern is arbitrary. By giving the pattern a perfectly arbitrary shape in a suitable manner and by deriving, on the basis of the obtained shape, a, for example, alphanumeric identification code by means of a predetermined algorithm, the pattern and the identification code being paired in one-to-one correspondence, it becomes possible to identify objects without the need for outsourcing, using a pattern provided thereon or connected thereto, with a practically negligible chance of a like pattern or a like identification code being generated elsewhere.

Of course, it is not necessary to start off from an arbitrary two-dimensional pattern and to derive an identification code from this by means of an algorithm. An arbitrary identification code can also form the starting point, an algorithm being used to generate a two-dimensional pattern. The only points of importance are that the two-dimensional pattern or the identification code are completely arbitrary and that there is a one-to-one correspondence between them.

The identification code can be stored in a file and can be coupled with associated identification information, such as data relating to the producer of the object and/or the owner thereof, and any other relevant information. A two-dimensional representation of the generated pattern is provided on the object to be identified, or on a pattern support to be attached thereto. In identifying the object, the two-dimensional representation of the pattern is optically scanned, on the basis of which the associated identification code is determined. The identification code gives access, in turn, to the identification information which is coupled thereto.

Given a suitable choice of the arbitrary two-dimensional pattern, the two-dimensional representation can be particularly small, more particularly considerably smaller than the usual barcodes and dotcodes, yet still has the same possible quantity of different identification codes. The two-dimensional representation will nevertheless be easy to read from a relatively large distance (in the order of a few metres) using a camera.

In a preferred embodiment of the method according to the invention, the step of generating the arbitrary two-dimensional pattern comprises the step of optically scanning one or more irregularly arranged bodies having an arbitrary three-dimensional shape, especially the optical scanning of a number of arbitrarily arranged individual fibres from a predetermined direction.

Fibres of this type can form part, for example, of an authenticity mark as described in U.S. Pat. No. 5,354,097, and the two-dimensional representation derived from the authenticity mark of an object, document or the like can be provided on one or more other objects, documents or the like which have to be identifiable as belonging with the object, document or the like being provided with the authenticity mark.

Further preferred embodiments of the invention are described in the subclaims.

According to the invention, a system for identifying one or more objects comprises: means for generating an arbitrary, two-dimensional, optically readable pattern and an identification code, the pattern and the identification code being paired in one-to-one correspondence by means of a predetermined algorithm; means for providing a two-dimensional representation of the pattern on the or each object, or on a label to be connected to the or each object; means for storing the identification code and associated identification information; means for optically scanning the representation of the pattern of the or each object; means for determining the associated identification code; and means for identifying the or each object on the basis of the identification information associated with the identification code.

Preferred embodiments of the system according to the invention are described in the sub-claims.

DESCRIPTION OF THE DRAWINGS

The invention is explained in greater detail below with reference to the appended drawing, in which.

DESCRIPTION OF THE PREFERRED EMBODIMENTS

Figure 1:
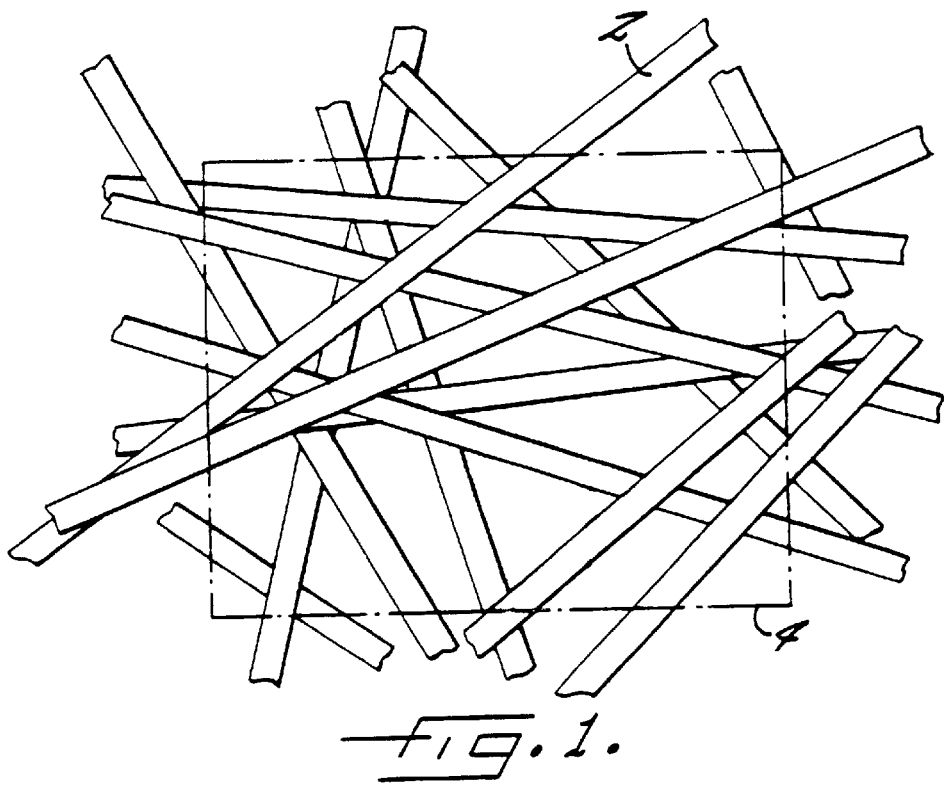
FIG. 1 shows, on a much enlarged scale, a portion of a sheet of material containing arbitrarily arranged individual fibres.

In the various figures, identical reference numerals relate to identical components or components having a similar function.

Figure 2:
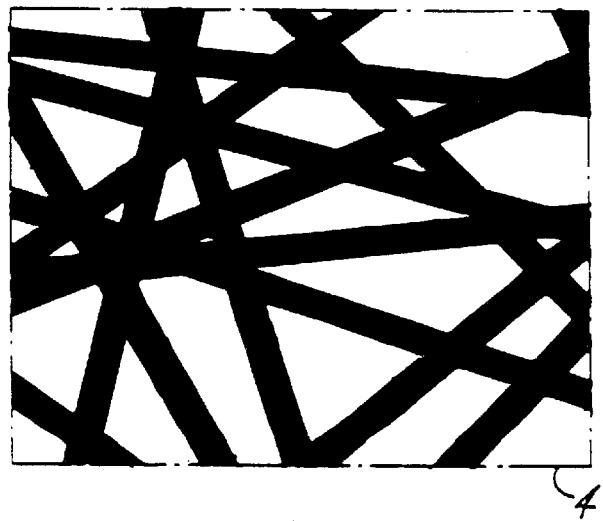
FIG. 2 shows a representation of a portion of the pattern formed by the fibres shown in FIG. 1.

FIG. 1 shows a portion of a sheet of material, for example a non-woven material having arbitrarily arranged overlying fibres 2, seen from a specific direction. By optically scanning at least one region 4 of the sheet of material, a two-dimensional representation of the pattern formed by the fibres 2 in the region 4 is obtained, as is shown in FIG. 2. By choosing a suitable algorithm, for which reference is made here to U.S. Pat. No. 5,354,097, an identification code can be derived from the representation according to FIG. 2.

Figure 4:
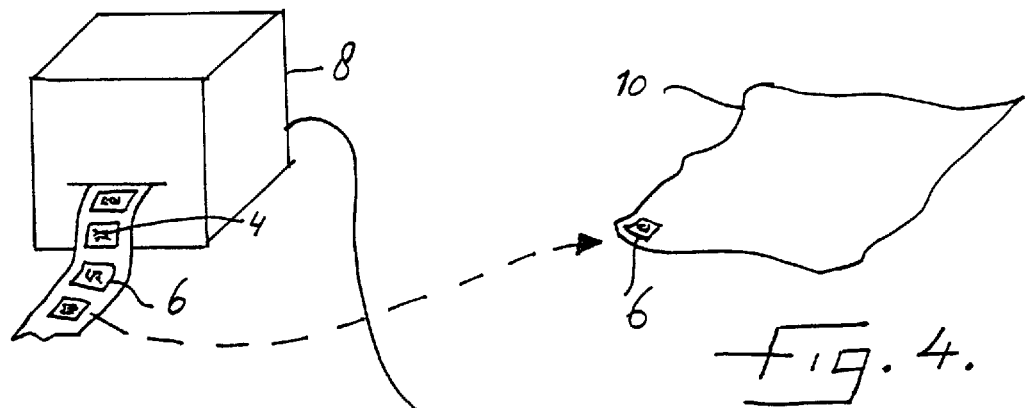
FIG. 4 shows an object being provided with a representation of an arbitrary two-dimensional pattern.
Figure 3:
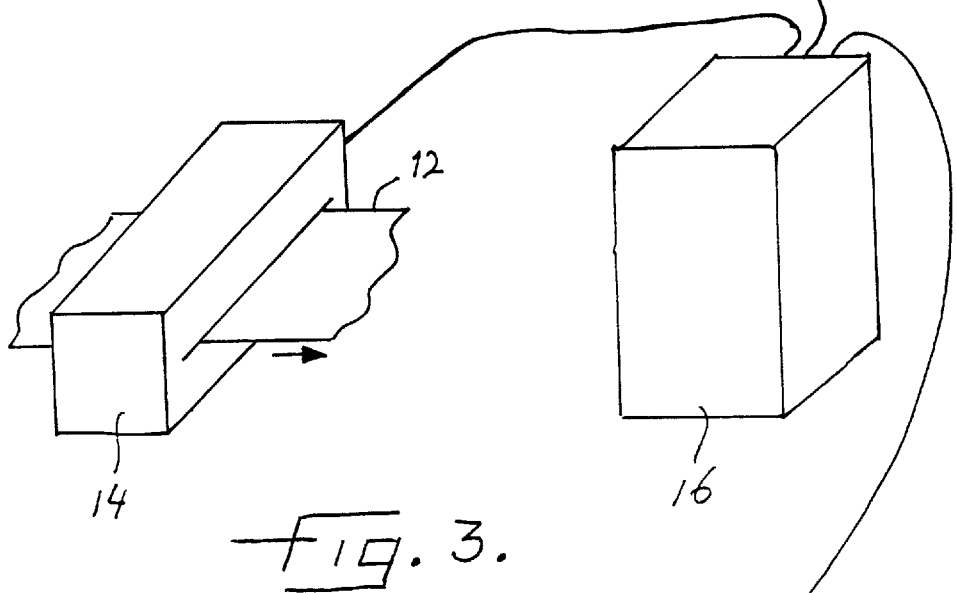
FIG. 3 shows a diagrammatic representation of a system according to the invention.
Figure 3:
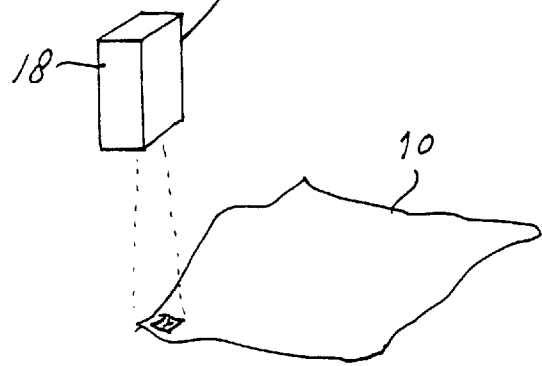

It is assumed that the representation according to FIG. 2 is used, on a preferably much reduced scale, to identify articles of washing in a laundry. As illustrated in FIG. 3, the representation is provided on a flexible sticker 6, using a printer 8 of sufficiently high resolution, and provided with a flexible protective layer. The sticker 6 is subsequently affixed to an article of washing 10, as illustrated in FIG. 4. Different articles of washing can have identical stickers, for example if owned by the same person.

The representation has been generated at an earlier stage with the aid of a sheet of material 12 comprising arbitrarily arranged individual fibres, as is shown in FIG. 1. FIG. 3 illustrates how a representation of essentially the whole sheet is scanned with a photo scanning device 14 having a resolution of, for example, 4,800–7,200 dpi (dots per inch), after which the scanning information is read into a computer 16 and stored in a memory. The computer 16 is designed for arbitrarily selecting a rectangular or differently shaped portion of the stored representation, the possible enlargement thereof, and printing the aforementioned portion onto the sticker 6 at a resolution of, for example, 300–600 dpi. Following this, the identification code belonging with the aforementioned portion is determined and registered in the computer 16, in association with other relevant data regarding the article of washing 10 to be identified, such as the owner thereof.

As further illustrated by FIG. 3, at the end of the washing process each article of washing 10 can be easily identified by optically scanning the sticker 6 attached thereto, using a digital camera 18 of sufficient resolution. If the representation is rectangular in shape, as shown in FIG. 2, a rotational correction of the image recorded with the camera can easily be effected in the computer 16 linked to the camera 18, thereby increasing the reliability of the system. On the basis of the recorded representation, the corresponding identification code is determined in the computer 16 and the article of washing 10 can be routed to a desired destination either manually or with automatic means.

The pictorial information obtained with the scanning device 14 does not need to be fed to the computer 16 as soon as it has been generated, but can also be registered on a well-known data carrier for later use in the computer 16. The pictorial information can thus be generated wholly independently from the manufacture and issue of the stickers 6, using the sheet of material 12.

It will be clear that the selection of a specific portion of the representation of the sheet of material 12 in the memory of the computer 16 in order to generate a representation can only be carried out once, owing to the desired uniqueness of the identification code. The sheet of material can therefore supply only a limited, albeit very large quantity of identification codes.

Instead of optically scanning essentially all of the sheet of material beforehand, storing the representation obtained thereby and the arbitrary selection of a portion of this representation for generating a representation of a pattern, the pattern can also, of course, be generated directly by optically scanning an arbitrary portion of the sheet of material and converting this into a two-dimensional representation.

In another possible application, a container is sealed using a seal in which a three-dimensional mark is recorded, as is described in U.S. Pat. No. 5,354,097,. The three-dimensional mark is optically scanned for generating a two-dimensional representation, which is provided on a number of labels, stickers or the like. These labels, stickers or the like are subsequently affixed to the goods present in the container, so that all goods are herewith assigned to the container and the corresponding unique sealing.

In yet another possible application, a banker's card or the like is provided with a three-dimensional mark as described in U.S. Pat. No. 5,354,097. The three-dimensional mark is optically scanned for the generation of a two-dimensional representation, which is provided on a cheque which is intended to be paid out to the owner of the banker's card. A positive identification of the cheque is thus possible when this is presented to a bank together with the banker's card.

What is claimed is:

1. A method for identifying an object, comprising:
   generating a representative two-dimensional, optically readable pattern, by optically scanning at least an irregularly arranged body having an arbitrary three-dimensional shape, and an identification code, the pattern and the identification code being paired in one-to-one correspondence by a predetermined algorithm and the pattern is arbitrary;
   providing a two-dimensional representation of the pattern on the object, or on a pattern support to be connected to the object;

storing the identification code and associated identification information;

optically scanning the representation of the pattern of the object;

determining the associated identification code; and identifying the object on the basis of the identification information associated with the identification code.

2. A method for identifying an object, comprising:

generating a representative two-dimensional, optically readable pattern, by optically scanning a number of arbitrarily arranged individual fibers, and an identification code, the pattern and the identification code being paired in one-to-one correspondence by a predetermined algorithm and the pattern is arbitrary;

providing a two-dimensional representation of the pattern on the object, or on a pattern support to be connected to the object;

storing the identification code and associated identification information;

optically scanning the representation of the pattern of the object;

determining the associated identification code; and identifying the object on the basis of the identification information associated with the identification code.

3. The method of claim 2, wherein the optical scanning of the arbitrarily arranged individual fibres is effected from a predetermined direction.

4. The method of claim 3, wherein the arbitrary two-dimensional pattern is generated by optically scanning a portion of a sheet of material containing arbitrarily arranged individual fibres.

5. The method of claim 3, for generating the arbitrary two-dimensional pattern further comprises:

optically scanning the geometric configurations of the of a sheet of material containing arbitrarily arranged individual fibres;

storing a two-dimensional representation of the geometric configurations of the fibres of the sheet of material; and selecting a predetermined region of the representation.

6. The method of claim 2, wherein the arbitrary two-dimensional pattern is generated by optically scanning a portion of a sheet of material containing arbitrarily arranged individual fibres.

7. The method of claim 2 for generating the arbitrary two-dimensional pattern further comprises:

optically scanning the geometric configurations of fibers the of a sheet of material containing arbitrarily arranged individual fibres;

storing a two-dimensional representation of the geometric configurations of the fibres of the sheet of material; and selecting a predetermined region of the representation.

8. A method for identifying an object, comprising:

generating a representative two-dimensional, optically readable pattern, by generating an arbitrary identification code and determining the associated pattern with the aid of an algorithm, the pattern and the identification code being paired in one-to-one correspondence by a predetermined algorithm and the pattern is arbitrary;

providing a two-dimensional representation of the pattern on the object, or on a pattern support to be connected to the object;

storing the identification code and associated identification information;

optically scanning the representation of the pattern of the object;

determining the associated identification code; and identifying the object on the basis of the identification information associated with the identification code.

9. A system for identifying an object comprising:

an identification code generator, the code generator capable of generating an identification code; an optical pattern generator, the optical pattern generator capable of generating a representative two-dimensional, optically readable pattern, the pattern and the identification code being paired in one-to-one correspondence by means of a predetermined algorithm;

a two-dimensional representation of the pattern on an object, or on a label to be connected to the object;

a storage mechanism capable of storing the identification code and associated identification information;

an optical scanner capable of scanning the representation of the pattern of the object;

a determination mechanism capable of determining the associated identification code; and an identifier capable of identifying the object on the basis of the identification information associated with the identification code, wherein the pattern is arbitrary, the optical pattern generator is an optical scanning device and the code generator is a data-processing system adapted for converting the optical information obtained during scanning into an identification code.

10. The system of claim 9, wherein the means for generating a two-dimensional, optically readable pattern and an identification code further comprises a sheet of material containing arbitrarily arranged individual fibres.

* * * * *